United States Patent [19]

Macdonald

[11] Patent Number: 4,731,176

[45] Date of Patent: Mar. 15, 1988

[54] CONTROL SYSTEM FOR FROTH FLOTATION PROCESSES

[75] Inventor: John R. Macdonald, Sydney, Australia

[73] Assignee: Century Autoflote Pty. Ltd., Australia

[21] Appl. No.: 27,340

[22] Filed: Mar. 18, 1987

[30] Foreign Application Priority Data

Mar. 20, 1986 [GB] United Kingdom ................. 8606944

[51] Int. Cl.[4] .............................................. B03D 1/02
[52] U.S. Cl. .................................... 209/166; 209/168; 209/1; 210/745; 210/96.1; 210/105; 436/55
[58] Field of Search ............... 209/162, 164, 166, 168, 209/167, 1; 210/745, 96.1, 105; 436/55

[56] References Cited

U.S. PATENT DOCUMENTS 3,551,897 12/1970 Cooper ................................. 209/166
3,860,513 1/1975 Hart .................................... 209/166

FOREIGN PATENT DOCUMENTS 158990 2/1983 German Democratic Rep. ..................................... 209/164
325036 1/1971 U.S.S.R. ............................. 209/166
722584 3/1980 U.S.S.R. ............................. 209/166
822900 4/1981 U.S.S.R. ............................. 209/166

OTHER PUBLICATIONS

Filtration and Separation Magazine, 11-12/78, pp. 610-614, Title="Turbity Control as an Aid in Water Filtration & Treatment".

Primary Examiner—S. Leon Bashore
Assistant Examiner—Thomas M. Lithgow
Attorney, Agent, or Firm—W. Thad Adams, III

[57] ABSTRACT

A method and apparatus for monitoring the operation of a froth flotation process comprises sensing variations in solids content of the input stream to the process, varying the dosage of flotation reagent employed in accordance with the input variations, sensing variations in solids content of at least one of the output streams after a predetermined time lapse, comparing the input and output readings with control data relating input and output solids content, and re-adjusting the dosage of flotation reagent dependent on the difference between the actual readings and the control data.

24 Claims, 2 Drawing Figures

CONTROL SYSTEM FOR FROTH FLOTATION PROCESSES

This invention relates to control systems for froth flotation processes and is particularly but not exclusively applicable to the control of processes employed in the froth flotation of coal.

Froth flotation processes are employed in mining to separate constituents of the mined material and in particular to extract products present in relatively small quantities and of small size, separation and extraction of which is difficult by other processes. In the mining of coal large quantities of small coal particles or "fines", generally those which will pass through a 0.5 mm sieve mesh, are produced. These fines are mixed with water and with quantities of dirt and particles of other minerals (together referred to as "ash") and it is desirable to extract as much of the coal fines as possible since these can be put in commerical use.

Froth flotation processes effect separation by subjecting the slurry of particles and water to action by flotation reagents. These are chemicals having a particular affinity to the particles to be extracted, which in the case of coal mining are the coal fines, and which render them hydrophobic. In the course of the flotation process the coal fines rise to the surface during which process they are separated from other particles which sink. There are thus two output streams from flotation processes of this kind, one being the frothed product incorporating the particles to be recovered and the other being the tailings consisting of the remaining unwanted material. The input slurry which is separated by the flotation process is referred to herein as the "raw feed".

The material to be treated by froth flotation varies considerably from one mining operation to another and can vary greatly in a relatively short period of time. Variable factors include the proportion of extractable particles to unwanted tailings and the proportion of ash entrained with the coal particles during the flotation process and forming part of the frothed product. This ash content requires to be maintained below certain levels if the frothed product is to be commerically acceptable. In order to obtain the best possible results the quantity and in some cases the type of flotation reagent added requires to be varied dependent on variations in the raw feed. Hitherto this has convenionally been effected by an operator in response to periodic visual inspection and based on determination of the persentage ash in each of the streams by conventional laboratory methods from manually taken samples. However in many instances a dosage of reagent giving the best average result over a wide range of raw feed inputs is maintained throughout the process due to the difficulty of effecting adjustments which respond quickly and effectively to the rapid variations in raw feed quality which occur.

With a view to improving performance attempts have been made to continuously monitor the condition of the raw feed and/or the frothed product and the tailings, and to vary the addition of flotation reagent dependent on the readings attained. Hitherto this has been effected by measurement of the ash content in the raw feed, frothed product and tailings which requires typically the use of radioactive means involving the use of complex and expensive equipment. It is an object of the present invention to provide an improved means of controlling a froth flotation process employing less sophisticated and expensive equipment and producing equivalent or improved results.

The invention provides a method for monitoring the operation of a froth flotation process having an input stream consisting of raw feed, a first output stream consisting of frothed product to be reclaimed and a second output stream consisting of tailings to be discarded, the method comprising sensing variations in solids content of said input stream, varying the dosage of flotation reagent employed in the process in accordance with said input variations, sensing variations in solids content of at least one of said output streams after a predetermined time lapse, comparing said input and output readings with control data relating input and output solids content, and re-adjusting the dosage of flotation reagent dependent on the difference between the actual readings and the control data.

Preferably the solids contents in said streams is assessed by measuring turbidity of samples withdrawn from the streams continuously or periodically. In order to compensate for limitations of currently available turbidity measuring apparatus the samples are preferably diluted by addition of water to reduce the solids contents of each sample in proportion to levels readable by the turbidity measuring apparatus. Where measuring is effected on continuously flowing samples the rate of flow of the samples is preferably maintained constant.

The invention also provides apparatus for monitoring the operation of a froth flotation process having an input stream consisting of raw feed, a first output stream consisting of frothed product to be reclaimed and a second output stream consisting of tailings to be discarded, the apparatus comprising means for assessing the solids content of said input stream, control means operable in response to signals derived from said assessment to vary the dosage of flotation reagent employed in the process, means for assessing the solids content of at least one of said output streams after a predetermined time lapse, comparator means adapted to receive signals generated in response to said assessments and to compare same with control data relating input and output solids content, and to generate a control signal dependant on said comparison, and further control means operable in resposne to said control signal to effect compensating adjustment of the dosage of flotation reagent employed in the process.

Preferably said time lapse approximates to the time taken for slurry to pass through the system between input and output sensing locations.

Preferably said means for assessing the solids content of said input and output streams comprises turbidity measuring means.

Preferably also said comparator means comprises a computer and said flotation reagents are added to the raw feed by metering means operation of which is controlled by output signals from said computer.

Advantageously additional sensing means may be employed to determine ash content in the frothed product, said additional sensing means being adapted to transmit control signals to said computer operable to vary the dosage of flotation reagent to maintain ash level in the frothed product between predetermined parameters.

An embodiment of the invention will now be described, by way of example only, with reference to the accompanying diagrammatic drawings, in which.

Figure 1:
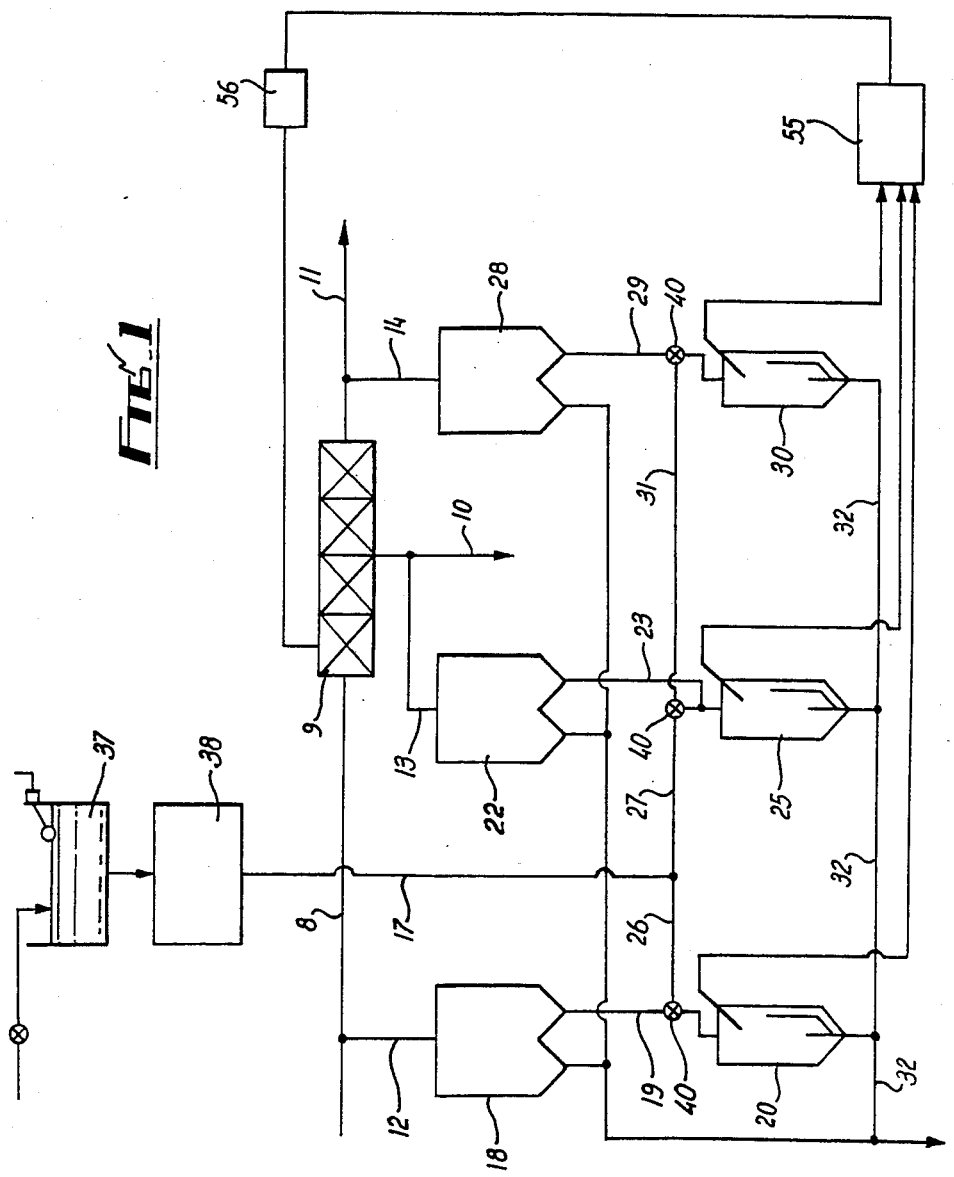
FIG. 1 is a flow diagram of a froth flotation system for coal recovery incorporating the invention.

Referring to the drawing, the raw feed material to be processed consists of a liquid or slurry incorporating coal fines and other particles or "ash" in water and is introduced through a supply pipe 8 to a froth flotation unit 9. The froth flotation unit consists of a series of treatment cells through which the raw feed passes and is brought into contact with froth flotation reagents having an affinity for the coal particles, rendering them hydrophobic. Air bubbles are generated in the cells and pass through the slurry and the hydrophobic coal particles attach themselves to the bubbles and rise to the surface from whence they are withdrawn into a discharge pipe 10 leading to a dewatering system. The tailings or unwanted material remaining after separation of the coal fines by the flotation process are drawn off through pipework 11 for disposal or subsequent treatment. Movement of the material through the system is effected by means of pumps (not shown) which maintain a uniform metered flow.

A sample of the raw feed is withdrawn from the pipe 8 prior to entry of the slurry into the froth flotation unit 9. Withdrawal is effected through a pipe 12 of predetermined diameter and is directed to a monitoring and control system referred to hereafter. The flow through the pipe 12 may be controlled by a restrictor valve or by a metering pump (not shown). Samples of the frothed product and of the tailings are withdrawn from the pipe 10 and discharge pipe 11 in a similar manner through pipes 13 and 14 respectively.

The raw feed withdrawn through pipe 12 is diluted by water introduced through auxiliary pipes 17 and 26 and delivered through an overflow unit 18 and pipe 19 to a sensing unit 20. The frothed product withdrawn from the pipe 10 is delivered through an overflow unit 22 and pipe 23 to a similar sensing unit 25. Prior to introduction to the sensing unit 25 water is added to the sample through a supply line 27 connected to the line 17. In a similar fashion the tailings withdrawn through pipe 14 are delivered through an overflow unit 28 and pipe 29, diluted by water introduced from an auxiliary pipe 31 and delivered to a sensing unit 30 similar to the units 20 and 25. The material discharged from all three of the sensing units is directed through a common discharge pipe 32 to a collecting tank (not shown) from whence it is returned to the flotation system. Water for dilution is supplied to the lines 26, 27, 31 and 17 from a common supply tank 37 through a flow/pressure regulator 38 and individual manually adjustable flow control valves 40.

Figure 2:
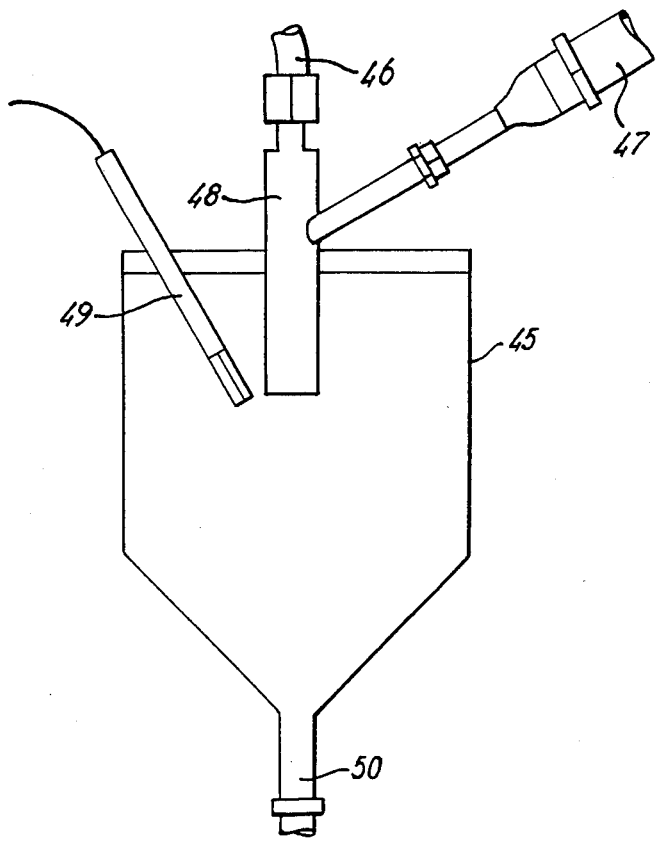
FIG. 2 is an enlarged diagrammatic cross-sectional view through a sampling and sensing unit.

Referring now to FIG. 2 of the drawings, each of the sensing units 20, 25 and 30 comprises a vessel or container 45 having a dilution water inlet 46 and a sample inlet 47 both connected to a mixing chamber 48 from which the diluted slurry is introduced into the vessel 45. A turbidity sensor 49 projects into the vessel adjacent to the outlet of the mixer 48. The turbidity sensor incorporates light emitting devices and light sensitive cells between which the diluted slurry passes. The sensor 49 produces an output signal dependent on the light intensity sensed by the cells and hence related to the solids content of the sample. Uniform dispersion of solids throughout the sample is ensured by the action of the mixing chamber 48. The sample is discharged from the vessel 45 to the discharge pipe 32 through an outlet pipe 50.

The turbidity sensors 49 are designed to measure turbidity or cloudiness of liquids and are not capable of operating satisfactorily where the liquid is contaminated by greater than about 2% solids content. Dilution of the various samples is therefore effected to reduce the solids content to a range capable of being handled by the turbidity sensors. For this purpose the maximum solids content likely to the encountered in each stream requires to be known in advance. In most froth flotation processes employed in coal reclamation the solids content in the raw feed will be in the region of 5% to 20%, usable raw feed will not produce a solids content in the tailings of greater than 15% and the solids content in the frothed product will typically be less than 40% otherwise the frothed product cannot be removed efficiently from the slurry surface in the froth flotation unit. It is thus possible from a knowledge of the maximum solids contents which will be encountered in each of the three streams for the poorest condition processable raw feed drived from any given mined material to calculate the extent of dilution required to produce samples for turbidity testing having a maximum solids content within the workable range of the turbidity sensors. Provided the rate of flow of each of the samples to be tested is maintained constant and the condition of the raw feed material does not become poorer than the worst material allowed for, the quantity of water to be added to each of the samples will remain constant throughout operation of the process and once determined can be preset by means of the manual flow control valves 40 in the main water supply line 17.

The signals from the turbidity sensors 49 in the raw feed sensing unit 20, are transmitted to a computer indicated diagrammatically at 55. The computer is programmed to produce output signals dependent on the input from the sensor to control metering pumps indicated at 56 supplying flotation reagents to the flotation unit 9. The computer is programmed with data relating the solids content of the raw feed to the proportions and/or nature of flotation reagents required to produce the best possible yield of frothed product. In response to this initial sensing of the raw feed therefore the computer generates a signal which is transmitted to the metering pumps 36 to control the supply of flotation reagents to the unit 9.

The signals from the turbidity sensors 49 in the frothed product and tailings streams are also transmitted to the computer following a lapse of time corresponding to the time taken for a notional unit of raw feed to pass through the system and appear as frothed product and tailings. The computer is programmed to compare the signals derived from the two output streams with the data previously supplied to the computer from the raw feed input stream. For this purpose the computer is preprogrammed with data relating the yield of frothed product to the reagent dosage and operates to calculate actual yield of frothed product determined from the input signals from the two output sensors and adjust the reagent supply pumps 56 to alter the reagent dosage in a manner to increase yield of frothed product and over-ride the initial settings derived from sensing the raw feed.

The yield/reagent dosage data with which the computer is programmed is determined by prior plant trials and covers the full spectrum of raw feeds normally associated with the plant. The system operates to adjust reagent dosage at predetermined time intervals, usually less than a minute and typically every twenty seconds, for the purpose of increasing yield compared with that calculated from the previously generated signals. The arrangement effects sensing and monitoring in two stages, initially setting the reagent dosage by reference to variations in the raw feed and thereafter altering the dosage following sensing of the output streams in the event alteration is necessary. This two stage monitoring operation reduces the degree of fluctuation in reagent dosage rates and produces increased control and stability of the process conditions compared with arrangements sensing conditions and effecting control responses based on sensing of the output streams only.

By virtue of the arrangement described the dosage of flotation reagents is continuously monitored and adjusted in accordance with readings taken on a continuous basis from the input and output flows of the flotation system thereby enabling the system to "hunt" continuously for maximum yield by automatically and regularly altering reagent dosage in accordance with variations in processing conditions. The use of diluted samples for testing enables measurement of solids content by sensing turbidity, thereby eliminating much of the complication and hence expense of previously proposed systems referred to above.

Various modifications may be made without departing from the invention. For example an additional sensor may be provided to monitor the ash content in the frothed product thus enabling the reagent dosage to be adjusted automatically to maintain ash content within predetermined limits. This provides a control over the quality of the resulting product in addition to the optimum yield of coal fines. Solids content of the sample streams may be measured by means other than turbidity sensing if desired. The system may also be adapted to vary the quantities and/or proportions of a number of different flotation reagents instead of a single reagent if required. Moreover while reference has been made herein primarily to the flotation separation of coal products, the invention is also applicable to the flotation separation of other minerals.

Whilst endeavouring in the foregoing specification to draw attention to those features of the invention believed to be of particular importance it should be understood that the Applicant claims protection in respect of any patentable feature or combination of features hereinbefore referred to and/or shown in the drawings, whether or not particular emphasis has been placed thereon.

I claim:

1. A method for monitoring the operation of a froth flotation process having an input stream consisting of raw feed slurry, a first output stream consisting of frothed product to be reclaimed and a second output stream consisting of tailings to be discarded, the method comprising sensing variations in solids content of said input stream, adjusting the dosage of flotation reagent employed in the process in accordance with said input variations, sensing variations in solids content of at least one of said output streams after a predetermined time lapse, comparing said input and output readings with control data relating input and output solids content, and re-adjusting the dosage of flotation reagent dependent on the difference between the actual readings and the control data.

2. A method according to claim 1 wherein said time lapse approximates to the time taken for slurry to pass through the system between input and output sensing locations.

3. A method according to claim 1 wherein the solids contents in said streams are sensed by measuring turbidity of samples withdrawn from the streams.

4. A method according to claim 3 wherein said samples are diluted by addition of water to reduce the solids contents of each sample in proportion to levels readable by turbidity measuring apparatus.

5. A method according to claim 4 wherein the maximum solids content of said samples to reduced to about 2%.

6. A method according to claim 4 wherein said samples are continuously flowing and in which the rate of flow is maintained substantially constant.

7. A method according to claim 2 wherein readjustment of reagent dosage is effected at intervals of less than one minute.

8. A method according to claim 1 wherein the ash content in said frothed product is also monitored and the reagent dosage adjusted to maintain the ash content within predetermined limits.

9. Apparatus for monitoring the operation of a froth flotation process having an input stream consisting of raw feed, a first output stream consisting of frothed product to be reclaimed and a second output stream consisting of tailings to be discarded, the apparatus comprising means for assessing the solids content of said input stream, control means operable in response to signals derived from said assessment to vary the dosage of flotation reagent employed in the process, means for assessing the solids content of at least one of said output streams after a predetermined time lapse, comparator means adapted to receive signals generated in response to said assessments and to compare same with control data relating input and output solids content and to generate a control signal dependent on said comparison, and said control means being operable in response to said control signal to effect compensating readjustment of the dosage of flotation reagent employed in the process.

10. Apparatus according to claim 9 wherein said time lapse approximates to the time taken for slurry to pass through the system between input and output assessment locations.

11. Apparatus according to claim 9 including means for withdrawing samples from said streams and directing same to said means for assessing solids content.

12. Apparatus according to claim 11 wherein said means for withdrawing samples includes take-off pipes which are provided with flow control means.

13. Apparatus according to claim 12 wherein said flow control means comprise metering pumps.

14. Apparatus according to claim 11 including means for diluting said samples prior to delivery to said means for assessing solids content.

15. Apparatus according to claim 14 wherein each of said means for diluting said samples and each means for assessing the solids content are combined to form a sensing unit including a dilution water inlet and a sample inlet connected to a mixing chamber.

16. Apparatus according to claim 15 wherein said means for assessing the solids content of said input and output streams comprises turbidity measuring means.

17. Apparatus according to claim 16 wherein said turbidity measuring means is located adjacent the outlet from said mixing chamber.

18. Apparatus according to claim 17 wherein said turbidity measuring means incorporates a light emitting device and a light sensitive cell between which the diluted sample passes, said light sensitive cell producing an output signal dependent on the light intensity sensed by the cell and hence related to the solids content of the sample.

19. Apparatus according to claim 15 including a common discharge pipe connected to all of said sensing units and arranged to return the discharged samples to said input stream.

20. Apparatus according to claim 9 wherein said comparator means comprises a computer.

21. Apparatus according to claim 18 wherein said comparator means comprises a computer and each of said sensing units is electrically connected to said computer to transmit each of said output signals thereto.

22. Apparatus according to claim 20 or 21 wherein said flotation reagents are added to the raw feed by metering means operation of which is controlled by output signals from said computer.

23. Apparatus according to claim 9 including additional assessment means to determine ash content in the frothed product.

24. Apparatus according to claim 23 wherein said additional sensing means is adapted to transmit control signals to said computer operable to vary the dosage of flotation reagent to maintain ash level in the frothed product between predetermined parameters.

* * * * *